(12) United States Patent
Zhang

(10) Patent No.: US 11,220,404 B2
(45) Date of Patent: Jan. 11, 2022

(54) ITEM SORTING AND STORAGE DEVICE

(71) Applicant: Shenzhen Jingjiang Yunchuang Technology Co., Ltd., Shenzhen (CN)

(72) Inventor: Xue-Qin Zhang, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 224 days.

(21) Appl. No.: 16/546,562

(22) Filed: Aug. 21, 2019

(65) Prior Publication Data

US 2020/0407175 A1 Dec. 31, 2020

(30) Foreign Application Priority Data

Jun. 28, 2019 (CN) .......................... 201910580486.3

(51) Int. Cl.
*B65G 47/71* (2006.01)
*B65B 59/00* (2006.01)
*B65B 57/00* (2006.01)

(52) U.S. Cl.
CPC .............. *B65G 47/71* (2013.01); *B65B 57/00* (2013.01); *B65B 59/00* (2013.01)

(58) Field of Classification Search
CPC .. B07C 5/00; B07C 5/34; B07C 5/342; B07C 2501/00; B65B 57/10; B65B 57/14; B65B 65/006; B65B 59/00; B65G 47/71
USPC .................................. 53/451, 461, 551, 203
See application file for complete search history.

(56) References Cited

U.S. PATENT DOCUMENTS

2016/0038980 A1* 2/2016 Nichols ................. G06T 7/0004
209/44.1
2018/0105363 A1* 4/2018 Lisso ................... B65G 47/844

FOREIGN PATENT DOCUMENTS

| CN | 202743842 | | 2/2013 |
| CN | 108636813 | A | 10/2018 |
| CN | 108855955 | A | 11/2018 |
| CN | 109335077 | A * | 2/2019 |
| CN | 109335077 | A | 2/2019 |
| CN | 109834063 | A | 6/2019 |
| CN | 109878962 | | 6/2019 |

OTHER PUBLICATIONS

Machine Translation of CN-109335077-A, Liu Zhigang (Year: 2021).*

* cited by examiner

*Primary Examiner* — Anna K Kinsaul
*Assistant Examiner* — Veronica Martin
(74) *Attorney, Agent, or Firm* — ScienBiziP, P.C.

(57) ABSTRACT

An item sorting and storage device includes an input unit, a sorting system, and a storage assembly. The input unit receives a number of items. The sorting system recognizes and sorts the number of items. The storage assembly receives the number of sorted items and records information of the number of sorted items.

18 Claims, 7 Drawing Sheets

ITEM SORTING AND STORAGE DEVICE

FIELD

The subject matter herein generally relates to storage devices, and more particularly to an item sorting and storage device.

BACKGROUND

Generally, items in daily life and industrial production require to be sorted and stored. Sorting and storage is generally performed manually, which is prone to error and is not efficient.

BRIEF DESCRIPTION OF THE DRAWINGS

Implementations of the present disclosure will now be described, by way of embodiments, with reference to the attached figures.

DETAILED DESCRIPTION

Figure 1:
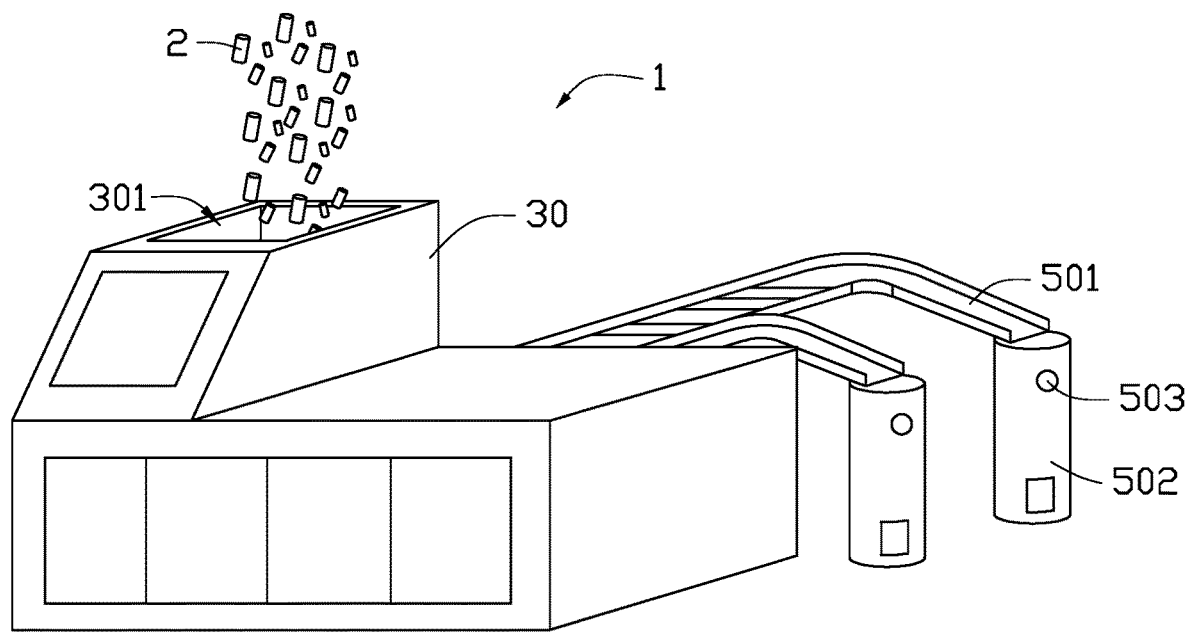
FIG. 1 is a schematic diagram of an embodiment of an item sorting and storage device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
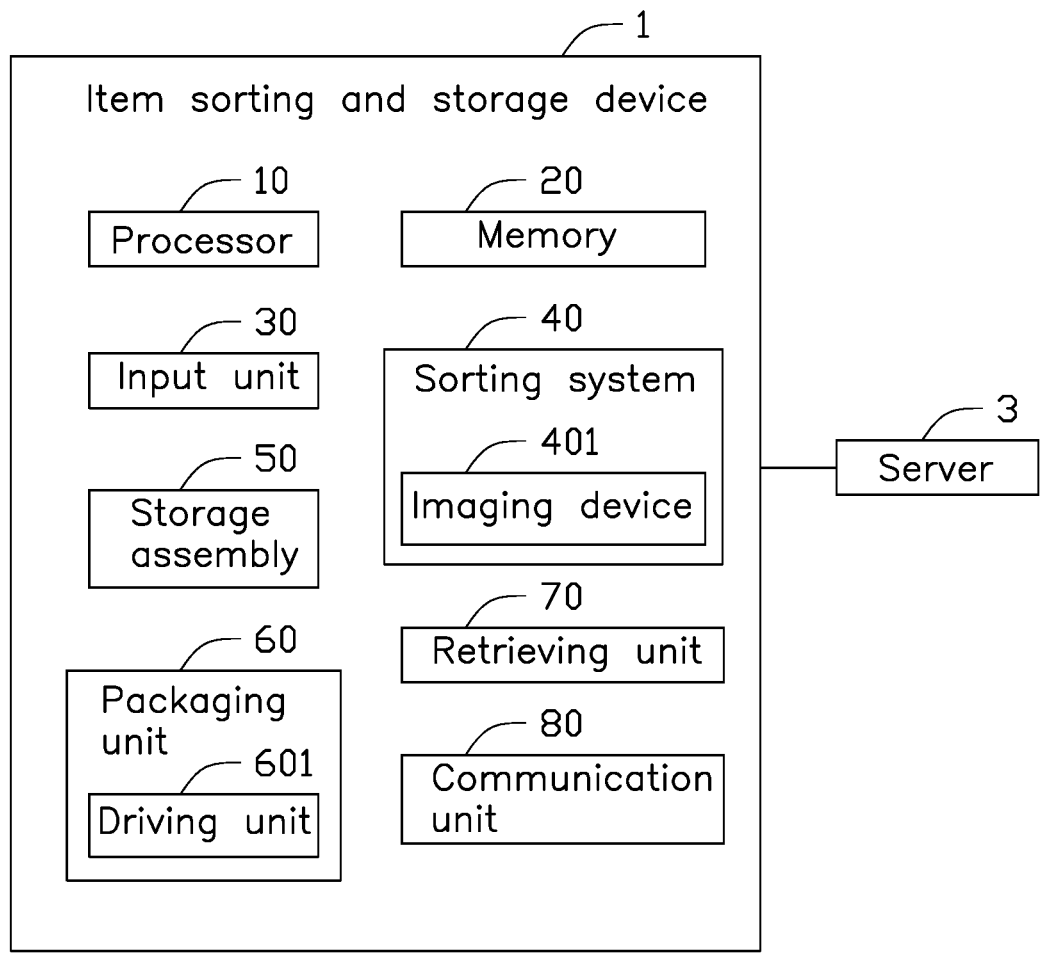
FIG. 2 is a block diagram of the item sorting and storage device in FIG. 1.

FIG. 1 shows a schematic diagram of an item sorting and storage device 1, and FIG. 2 shows a block diagram of the item sorting and storage device 1. The item sorting and storage device 1 sorts and stores a plurality of different types of items. The item sorting and storage device 1 includes, but is not limited to, a processor 10, a memory 20, an input unit 30, a sorting system 40, and a storage assembly 50.

The processor 10 may be a single chip microcomputer or a system on a chip. The memory 20 may be a non-volatile random access memory.

The item 2 is input into the input unit 30. In one embodiment, the input unit 30 includes an input port 301 for receiving a plurality of items 2 to be stored. The types of items to be stored may be different or the same. In other embodiments, the input unit 30 may also include a plurality of input ports 301. Each of the input ports 301 corresponds to one type of items 2 to be stored.

In one embodiment, the sorting system 40 is installed in the input unit 30 for identifying and sorting the items 2 to be stored. Specifically, the sorting system 40 identifies and sorts the items 2 by using a machine vision and deep learning method, and acquires identified item information. In one embodiment, the sorting system 40 includes at least an imaging device 401 for capturing an image of the item 2 to be stored, recognizing an appearance of the item 2 according to the captured image, and sorting the items 2 having the same or similar appearance into one category. The sorting system 40 also stores identification information in the memory 20. The identification information includes at least appearance information and type information of the items 2 to be stored. The type information may include a name of the items 2.

In other embodiments, the sorting system 40 includes an infrared sensor (not shown) and a laser generator (not shown) for detecting a shape and size of the items 2 by infrared rays and laser light, so that the items 2 having the same or similar size and shape are sorted and stored in the same category.

The storage assembly 50 transports the sorted items 2 and records the information of the items 2 to be stored. In one embodiment, the storage assembly 50 includes a plurality of conveyors 501 and a plurality of first receiving portions 502. A first end of each conveyor 501 is coupled to the input unit 30, and a second end of each conveyor 501 is coupled to a respective first receiving portion 502 for carrying and transporting the sorted item 2 to the respective first receiving portion 502 in which the sorted item 2 is stored.

Figure 3:
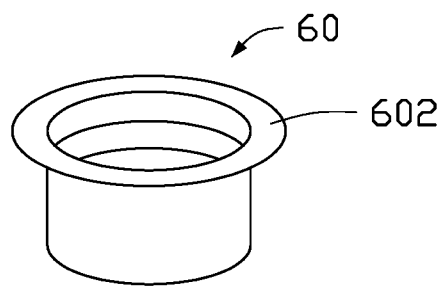
FIG. 3 is a diagram showing a first receiving portion, a second receiving portion, and a packaging unit of a storage assembly of the item sorting and storage device.
Figure 3:
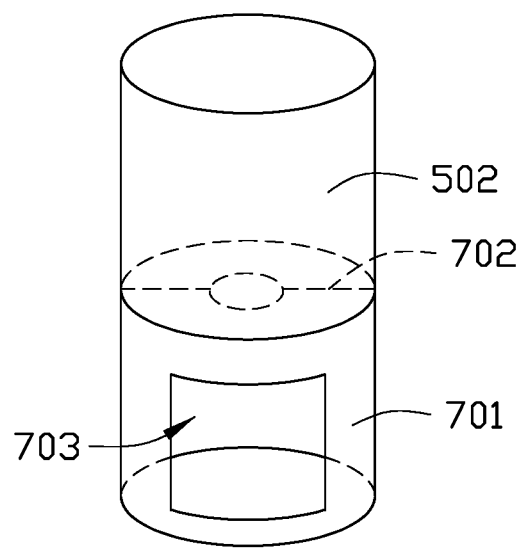

Referring to FIG. 3, each of the first receiving portions 502 has a substantially hollow cylindrical shape for receiving a plurality of the sorted items 2 of the same type. When the item 2 is input into the input unit 30 and sorted by the sorting system 40, the sorted item 2 automatically enters the corresponding conveyor 501, and the sorted item 2 is transported by the conveyor 501 into the respective first receiving portion 502. In one embodiment, the conveyor 501 is a conveyor belt.

Referring again to FIG. 1, in one embodiment, each first receiving unit 502 includes an information transceiver module 503 for recording information of the sorted item 2. The information includes at least appearance information, type information, and location information of the item 2 identified by the sorting system 40. In one embodiment, the information transceiving module 503 is a radio frequency identification (RFID) chip. The location information is latitude and longitude information.

As shown in FIG. 2 and FIG. 3, a packaging unit 60 is inserted in the first receiving portion 502. The packaging unit 60 packages the sorted items 2 stored by the first receiving portion 502, thereby completing storage of the items 2. In one embodiment, the packaging unit 60 includes a driving unit 601 and a packaging portion 602. The packaging portion 602 has a substantially hollow cylindrical shape and has an outer diameter less than an outer diameter of the first receiving portion 502. When the packaging unit 60 is inserted in the first receiving portion 502, the packaging portion 602 resists an upper end of the first receiving portion 502.

In one embodiment, the packaging portion 602 is wound with a packaging material. The packaging material may be wrapping paper, plastic, foam, tin foil, or the like. A suitable packaging material may be selected according to the type of the item 2 to be packaged. When the item 2 falls into the first receiving portion 502, the processor 10 controls the driving unit 601 to drive the packaging portion 602 to rotate to cover the packaging material on the item 2. The packaging portion 602 can be removed from the first receiving portion 502 to be replaced when the packaging material is used up.

In one embodiment, the retrieving unit 70 is fixedly coupled to the first receiving portion 502. The retrieving unit 70 receives the item 2 from the first receiving portion 502.

Specifically, the retrieving unit 70 includes a second receiving portion 701 and a spring device 702. The second receiving portion 701 has a substantially hollow cylindrical shape. One end of the second receiving portion 701 abuts against the first receiving portion 502, and the second receiving portion 701 defines an opening 703. The item 2 is taken out of the second receiving portion 701 through the opening 703. The spring device 702 is disposed at a joint between the first receiving portion 502 and the second receiving portion 701, and the item 2 rests on the spring device 702 in the first receiving portion 502.

Figure 4:
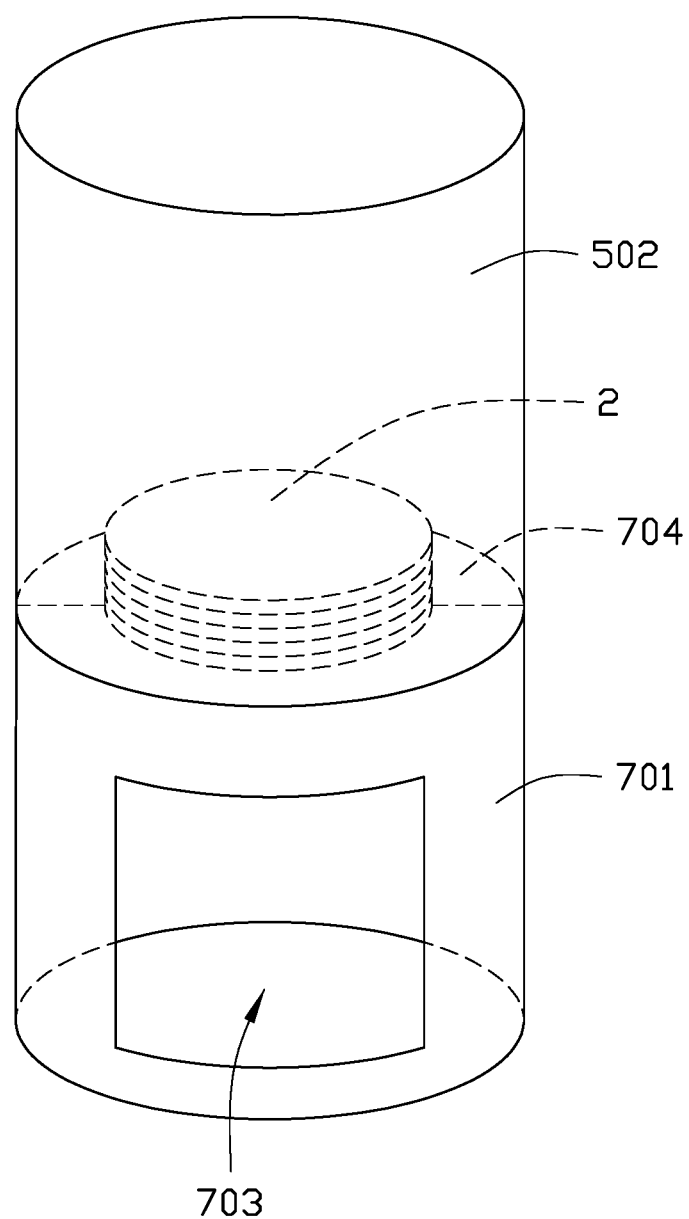
FIG. 4 is a diagram of the first receiving portion and the second receiving portion, wherein the first receiving portion receives a sorted item.
Figure 5:
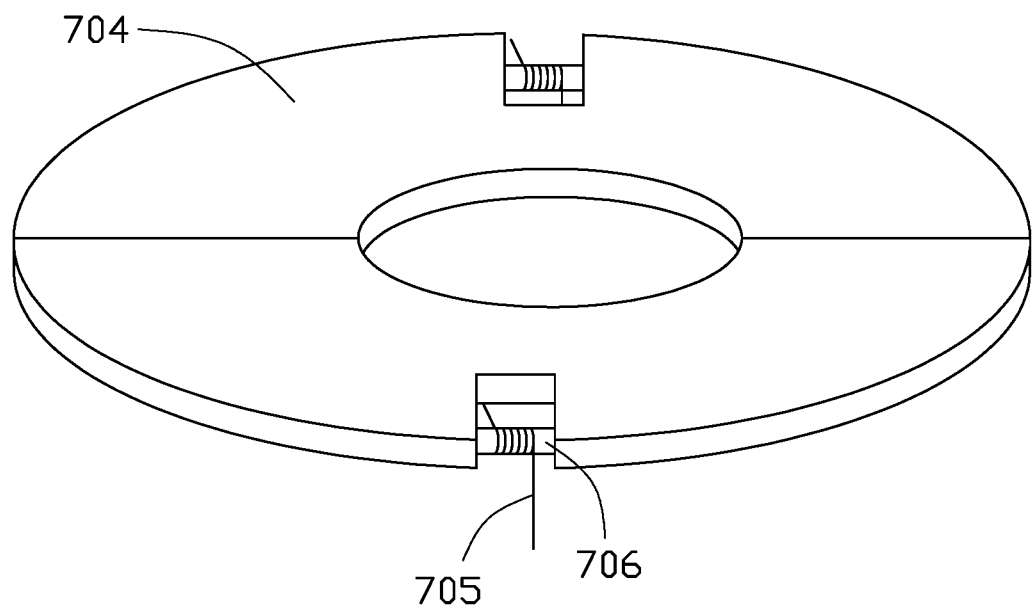
FIG. 5 is a diagram of a spring device.

Referring to FIG. 4 and FIG. 5, the spring device 702 includes two resilient panels 704, two springs 705, and two fixing rods 706. Each of the resilient panels 704 defines a notch (not labeled). Each fixing rod 706 is fixedly mounted in the respective notch, and each spring 705 is sleeved on the respective fixing rod 706 for driving the resilient panel 704 to reset. A first side of each resilient panel 704 is rotationally disposed on an inner wall of the joint between the second receiving portion 701 and the first receiving portion 502, and a second side of each resilient panel 704 is free-hanging.

The two resilient panels 704 have a certain load-bearing capacity. When a weight of the items 2 resting on the spring device 702 exceeds the load-bearing capacity, the two resilient panels 704 are rotated downward, and the items 2 fall into the second receiving portion 701, at which time the items 2 can be taken out from the opening 703 of the second receiving portion 701. In one embodiment, the load-bearing capacity is one kilogram. The springs 705 restore a position of the two resilient panels 704 after the items 2 fall into the second receiving portion 701. In one embodiment, the springs 705 are torsion springs.

Figure 6:
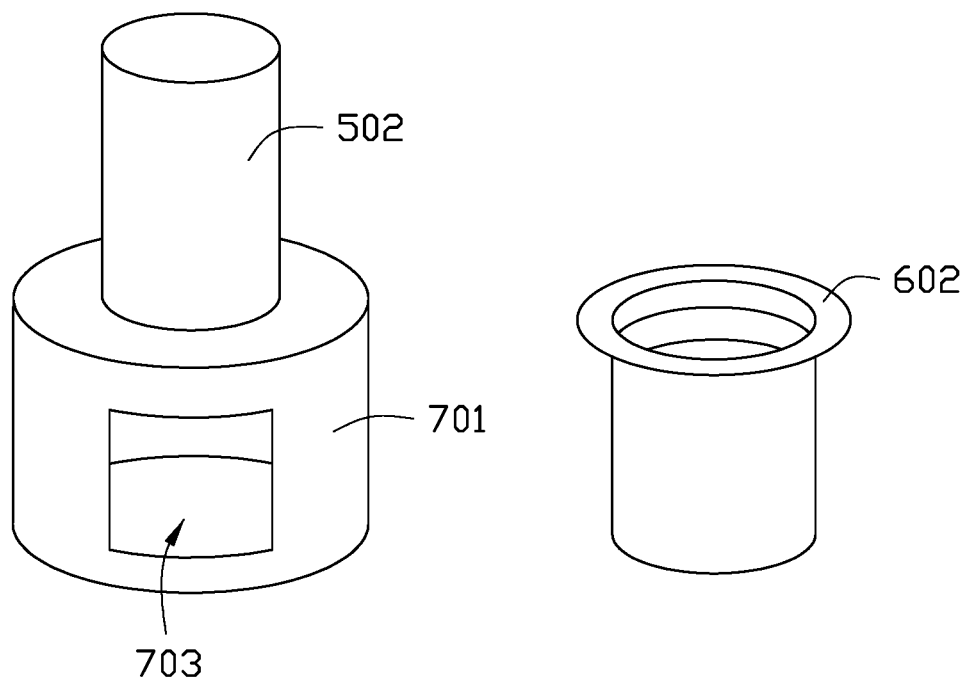
FIG. 6 is a diagram of another embodiment of the packaging unit coupled to the second receiving portion.

Referring to FIG. 6, in a second embodiment of the item sorting and storage device 1, the packaging unit 60 may be disposed in the second receiving portion 701. When the item 2 falls into the second receiving portion 701, the processor 10 controls the driving unit 601 to drive the packaging portion 602 to rotate to cover the packaging material on the item 2. In the second embodiment, the packaging portion 602 can be removed from the second receiving portion 701 to be replaced when the packaging material is used up.

Figure 7:
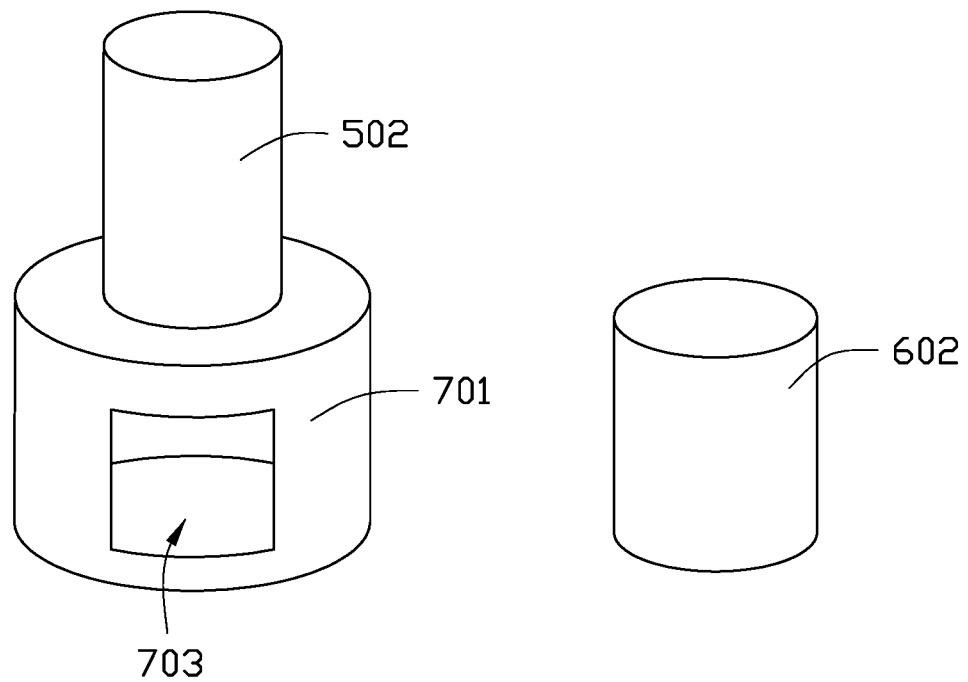
FIG. 7 is a diagram of another embodiment of the packaging unit coupled to the second receiving portion.

Referring to FIG. 7, in a third embodiment of the item sorting and storage device 1, the packaging portion 602 is a receiving barrel disposed in the second receiving portion 701 for receiving the items 2 falling from the first receiving portion 502 without packaging the items 2. In the third embodiment, the packaging portion 602 can be removed from the second receiving portion 701 through the opening 703 to be replaced when the packaging portion 602 is filled with the items 2.

Further, the item sorting and storage device 1 includes a communication unit 80. The communication unit 80 may be disposed on the storage assembly 50. The memory 20 stores information of the items 2 received by each first receiving portion 502 recorded by the information transceiving module 503, a serial number of each first receiving portion 502, and fault information of each first receiving portion 502. The fault information includes at least a fault cause and a fault location. In one embodiment, the communication unit 80 is a wired or wireless communication device and can be communicably coupled to a server 3 through a communication method such as ZigBee, Wi-Fi, BLUETOOTH, or the Internet. The processor 10 sends a control command to the communication unit 80 at predetermined time intervals to control the communication unit 80 to upload the information of the items 2 received by each first receiving portion 502, the serial number of each first receiving portion 502, and the fault information of each first receiving portion 502 to the server 3 to facilitate remote control and management of the item storage apparatus 1 by the server 3.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An item sorting and storage device comprising:
   an input unit adapted for receiving a plurality of items;
   a sorting system adapted for recognizing and sorting the plurality of items;
   a storage assembly comprising a plurality of first receiving portions adapted for receiving the plurality of sorted items and recording information of the plurality of sorted items; and
   a plurality of packaging units, wherein:
   each of the plurality of packaging units is disposed corresponding to a respective first receiving portion and is configured for packaging the items received by the first receiving portion;
   each of the plurality of packaging units comprises a driving unit and a packaging portion;
   the packaging portion is inserted in the first receiving portion;
   the packaging portion has a packaging material wound therearound;
   when an item is disposed into the first receiving portion, the driving unit is configured for driving the packaging portion to place the packaging material on the item, the packaging portion is removable from the first receiving portion and is replaceable with a new packaging portion when the packaging material is used up.

2. The item sorting and storage device of claim 1, wherein:
the sorting system identifies and sorts the items by machine vision and deep learning methods, and acquires identified item information.

3. The item sorting and storage device of claim 1, wherein:
the storage assembly comprises a plurality of conveyors;
a first end of each of the conveyors is coupled to the input unit, and a second end of each of the conveyors is coupled to a respective first receiving portion for carrying and transporting the sorted item to the respective first receiving portion in which the sorted item is stored;
each of the first receiving portions stores a plurality of items of the same type.

4. The item sorting and storage device of claim 3, wherein:
each of the first receiving portions comprises an information transceiving module;
the information transceiving module records the information of the items;
the information comprises at least appearance information, type information, and location information of the item identified by the sorting system.

5. The item sorting and storage device of claim 3, further comprising a plurality of retrieving units respectively coupled to the first receiving portions, wherein:
the retrieving unit receives the item received by the first receiving portion.

6. The item sorting and storage device of claim 5, wherein:
each of the retrieving units comprises a second receiving portion and a spring device;
one end of the second retrieving portion is coupled to the first receiving portion;
the spring device is disposed at a joint between the respective one of the first receiving portions and the second receiving portion;
the items received by the first receiving portion is received on the spring device.

7. The item sorting and storage device of claim 6, wherein:
when a weight of the items in the first receiving portion exceed a load-bearing capacity of the spring device, the items in the first receiving portion fall through the spring device into the second receiving portion.

8. The item sorting and storage device of claim 6, wherein:
the spring device comprises two resilient panels and two springs;
each of the two springs is mounted on a respective one of the resilient panels;
a first side of each of the resilient panels is rotationally disposed on an inner wall of the joint between the second receiving portion and the first receiving portion, and a second side of each of the resilient panels is free-hanging;
when a weight of the items on the two resilient panels exceeds a load-bearing capacity of the resilient panels, the two resilient panels rotate downward, and the items fall into the second receiving portion;
the two springs restore a position of the two resilient panels after the items fall into the second receiving portion.

9. The item sorting and storage device of claim 1, further comprising a communication unit disposed on the storage assembly, wherein:
the communication unit is communicatively coupled to a server;
the communication unit uploads the information of the storage assembly to the server.

10. An item sorting and storage device comprising:
an input unit receiving a plurality of items;
a sorting system recognizing and sorting the plurality of items;
a storage assembly comprising a plurality of first receiving portions, each of the plurality of first receiving portions receiving the sorted items of the same type and recording information of the plurality of sorted items; and
a plurality of packaging units, wherein:
each of the plurality of packaging units is disposed corresponding to a respective first receiving portion and is configured for packaging the items received by the first receiving portion;
each of the plurality of packaging units comprises a driving unit and a packaging portion;
the packaging portion is inserted in the first receiving portion;
the packaging portion has a packaging material wound therearound;
when an item is disposed into the first receiving portion, the driving unit is configured for driving the packaging portion to place the packaging material on the item, the packaging portion is removable from the first receiving portion and is replaceable with a new packaging portion when the packaging material is used up.

11. The item sorting and storage device of claim 10, wherein:
the sorting system identifies and sorts the items by using a machine vision and deep learning method, and acquires identified item information.

12. The item sorting and storage device of claim 10, wherein:
the storage assembly further comprises a plurality of conveyors;
a first end of each conveyor is coupled to the input unit, and a second end of each conveyor is coupled to a respective one of the first receiving portions for carrying and transporting the sorted item to the respective first receiving portion in which the sorted item is stored.

13. The item sorting and storage device of claim 12, wherein:
each of the first receiving portions comprises an information transceiving module;
the information transceiving module records the information of the items;
the information comprises at least appearance information, type information, and location information of the item identified by the sorting system.

14. The item sorting and storage device of claim 12, further comprising a plurality of retrieving units respectively coupled to the first receiving portions, wherein:
the retrieving unit receives the item received by the first receiving portion.

15. The item sorting and storage device of claim 14, wherein:
the retrieving unit comprises a second receiving portion and a spring device;
one end of the second retrieving portion is coupled to the first receiving portion;

the spring device is disposed at a joint between the first receiving portion and the second receiving portion;

the items received by the first receiving portion rest on the spring device.

16. The item sorting and storage device of claim 15, wherein:

when a weight of the items in the first receiving portion exceed a load-bearing capacity of the spring device, the items in the first receiving portion fall through the spring device into the second receiving portion.

17. The item sorting and storage device of claim 15, wherein:

the spring device comprises two resilient panels and two springs;

each of the two springs is mounted on a respective one of the resilient panels;

a first side of each resilient panel is rotationally disposed on an inner wall of the joint between the second receiving portion and the first receiving portion, and a second side of each resilient panel is free-hanging;

when a weight of the items on the two resilient panels exceeds a load-bearing capacity of the resilient panels, the two resilient panels rotate downward, and the items fall into the second receiving portion;

the two springs restore a position of the two resilient panels after the items fall into the second receiving portion.

18. The item sorting and storage device of claim 10, further comprising a communication unit disposed on the storage assembly, wherein:

the communication unit is communicatively coupled to a server;

the communication unit uploads the information of the storage assembly to the server.

* * * * *